United States Patent
Chadwick et al.

(10) Patent No.: US 10,509,457 B2
(45) Date of Patent: Dec. 17, 2019

(54) ADAPTIVE FREQUENCY OPTIMIZATION IN PROCESSORS

(71) Applicant: International Business Machines Corporation, Armonk, NY (US)

(72) Inventors: Nathaniel R. Chadwick, Medford, MA (US); Bjorn P. Christensen, Round Rock, TX (US); James M. Crafts, Warren, VT (US); Allen R. Hall, Austin, TX (US); Kevin F. Reick, Round Rock, TX (US); Jon Robert Tetzloff, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/480,963

(22) Filed: Apr. 6, 2017

(65) Prior Publication Data

US 2018/0292878 A1 Oct. 11, 2018

(51) Int. Cl.
| | |
|---|---|
| *G06F 1/24* | (2006.01) |
| *G06F 9/00* | (2006.01) |
| *G06F 1/324* | (2019.01) |
| *G06F 1/3296* | (2019.01) |
| *G06F 1/3234* | (2019.01) |

(52) U.S. Cl.
CPC .............. *G06F 1/324* (2013.01); *G06F 1/24* (2013.01); *G06F 1/3243* (2013.01); *G06F 1/3296* (2013.01)

(58) Field of Classification Search
CPC .............................. G06F 1/324; G06F 1/3296
See application file for complete search history.

(56) References Cited

U.S. PATENT DOCUMENTS

| | | | |
|---|---|---|---|
| 6,788,156 B2 | 9/2004 | Tam et al. | |
| 7,913,071 B2 | 3/2011 | Mallik et al. | |
| 8,245,070 B2 | 8/2012 | Finkelstein et al. | |
| 8,981,751 B1 | 3/2015 | Young et al. | |
| 2007/0234075 A1* | 10/2007 | Zimmer | G06F 1/32 713/300 |

(Continued)

FOREIGN PATENT DOCUMENTS

WO 2007056705 5/2007

OTHER PUBLICATIONS

Grenat, et al., "Adaptive Clocking System for Improved Power Efficiency in a 28mm x86-64 Microprocessor", IEEE International Solid-State Circuits Conference, Feb. 10, 2014, 3 pages.

*Primary Examiner* — Xuxing Chen
(74) *Attorney, Agent, or Firm* — DeLizio Law, PLLC

(57) ABSTRACT

A processor can have a plurality of cores. A first core processor of a first core can read one or more values of a default parameter set. The first core can be operated in accordance with a first operating characteristic based, at least in part, on the one or more values of the default parameter set. The first core processor can receive an indication to change the operating characteristic of the first core processor. In response to receiving the indication to change the operating characteristic, a signal can be issued to the first core processor to reset. In response to the reset, the first core processor can read one or more values of an alternative parameter set. The first core processor can then be operated in accordance with a second operating characteristic based, at least in part, on the one or more values of the alternative parameter set.

17 Claims, 5 Drawing Sheets

(56) References Cited

U.S. PATENT DOCUMENTS

| | | | |
|---|---|---|---|
| 2012/0317568 A1* | 12/2012 | Aasheim | G06F 9/45558 |
| | | | 718/1 |
| 2013/0117589 A1* | 5/2013 | Satyamoorthy | G06F 1/324 |
| | | | 713/320 |
| 2016/0077572 A1 | 3/2016 | Chang | |
| 2016/0252943 A1* | 9/2016 | Varma | G06F 15/00 |
| | | | 713/310 |

* cited by examiner

ADAPTIVE FREQUENCY OPTIMIZATION IN PROCESSORS

BACKGROUND

Embodiments of the inventive subject matter generally relate to the field of computer processors, and, more particularly, to adaptive frequency optimization in such processors.

Microprocessor circuits are typically optimized during the design phase for target voltage and frequency operating points based on design and technology models. Physical hardware may exhibit behavior that is not accurately predicted by the technology models and result in the need for tuning the circuits. Such tuning can occur either in design via design updates or in hardware via built-in tuning controls. Typically these tuning controls use a scan-only methodology that sets the operating characteristics during the boot-up of the microprocessor and remain constant during operation.

SUMMARY

A processor can have a plurality of cores. A first core processor of a first core can read one or more values of a default parameter set. The first core can be operated in accordance with a first operating characteristic based, at least in part, on the one or more values of the default parameter set. The first core processor can receive an indication to change the operating characteristic of the first core processor. In response to receiving the indication to change the operating characteristic. A signal can be issued to the first core processor to reset. In response to the reset, the first core processor can read one or more values of an alternative parameter set. The first core processor can then be operated in accordance with a second operating characteristic based, at least in part, on the one or more values of the alternative parameter set.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. Well-known instruction instances, protocols, structures and techniques have not been shown in detail in order not to obfuscate the description.

A processor can be configured for adaptive frequency optimization. In some aspects, the processor can store a default parameter set and an alternative parameter set. A core processor of a core of the processor can initially operate according to one or more characteristics defined by the default parameter set. The core can be signaled to change to the alternative parameter set. In response to the signal, the core can be reset. As part of the reset, the core processor can read parameter from the alternative parameter set, and operate according to one or more characteristics defined by the alternative parameter set. The characteristics can include frequency, voltage, combinations of frequency and voltage, or timing data.

Figure 1:
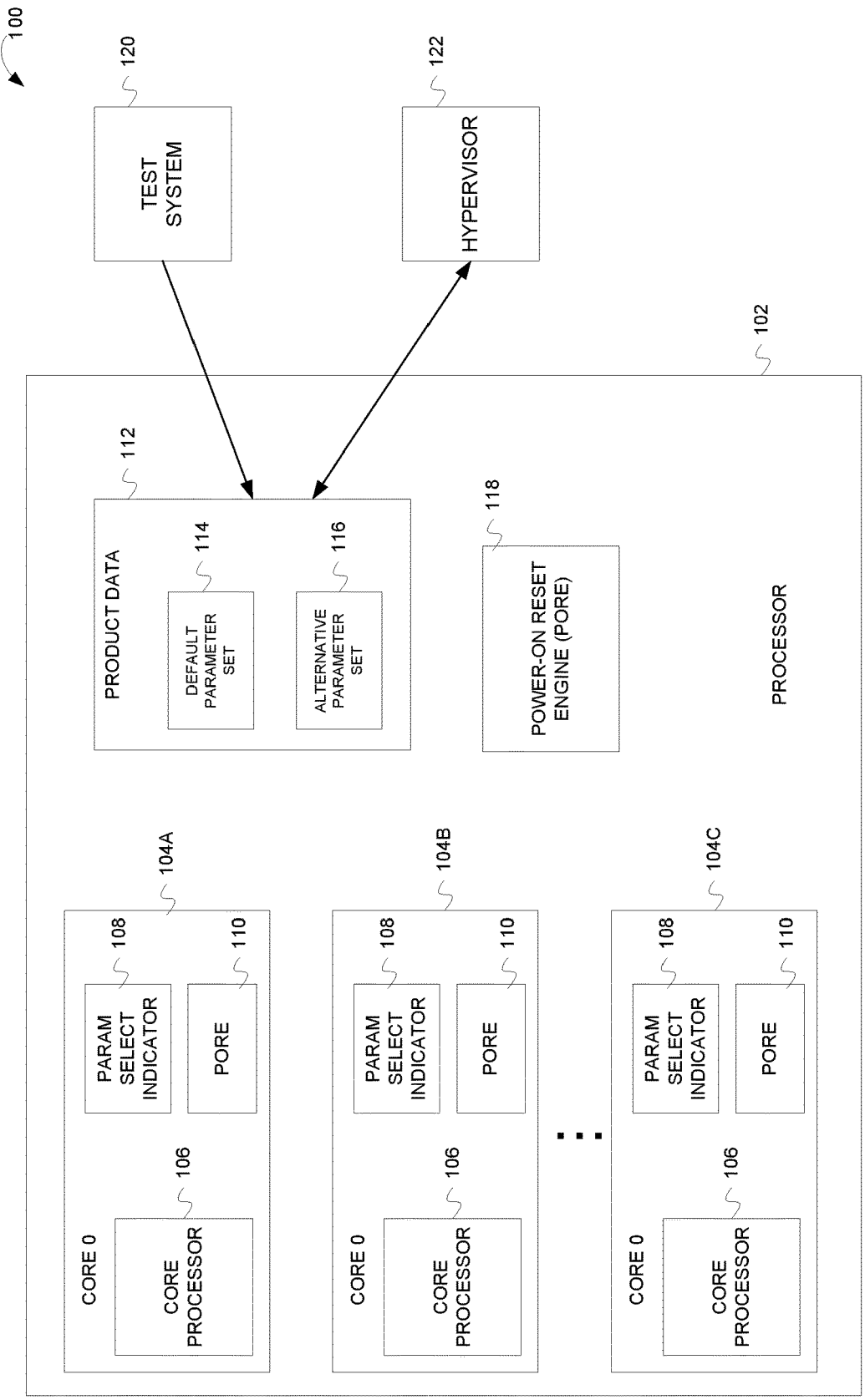
FIG. 1 depicts a system for adaptive frequency optimization according to aspects of the disclosure.

FIG. 1 depicts a system 100 for adaptive frequency optimization according to aspects of the disclosure. In some aspects, system 100 includes a processor 102, a test system 120, and optionally, a hypervisor 122.

Processor 102 can include one or more cores (e.g., cores 104A, 104B, and 104C), product data 112, and a power-on reset engine 118. A core can include a core processor 106, a parameter select indicator 108, and a power-on reset engine 110. A core can also include supporting logic units for the core and other components (cache, power management etc.), however such components are not shown in FIG. 1 in order to prevent obfuscating the inventive aspects of the disclosure. Further, although three cores (e.g., cores 104A, 104B and 104C) are illustrated in FIG. 1, those of skill in the art having the benefit of the disclosure will appreciate that a processor 102 may have more or fewer cores.

Product data 112 comprises parameter settings that are stored on a non-volatile memory device on processor 102. In some aspects, product data 112 is stored in an area referred to as the processor's Vital Product Data (VPD). In some aspects, the memory device can be a Serial Electrically Erasable Programmable Read-Only Memory (SEEPROM). The SEEPROM comprises an eight-pin chip package that can be written via a serial interface to the processor module. The product data 112 and other components of the VPD can be written during or following a manufacturing test performed on the processor 102 prior to shipment to customers.

In some aspects, the product data 112 includes a default parameter set 114, and an alternative parameter set 116. The default parameter 114 set can include frequency and voltage parameters that are established for a group of processors that are tested during a manufacturing test by a test system 120 operated by a processor manufacturer. The parameters may be chosen by the manufacturer according to a desired yield. Each of the processors in the group are indicated by the manufacturer to run properly using the frequency and voltage parameters established in the default parameter set 114.

In some aspects, the parameter sets can also include timing data or other tuning data that affect the timing or tuning of sections of a core 104. The timing data can comprise timing bits, wherein the setting of the bits can affect how logical sections of the core 104 operate in order to meet timing constraints. In some aspects, the timing data can be tuned for a particular frequency or range of frequencies.

Some of the processors in the tested group may be capable of being operated at different frequency and voltage combinations than those indicated for the group. For example, to meet yield goals, the manufacturer may place into a group of processors that are able to run at higher frequencies or lower voltages than that specified for the group. Alternatively, some of the processors may be able to operate using a wider range of voltage and frequencies than that specified for the group. Test system 120 can store such parameters in alternative parameter set 116. Thus, alternative parameter set 116 can store parameter values that may be specific to a processor, and can be different from those stored in the default parameter set 114. For example, the alternative parameter set 116 may store parameters that specify a higher frequency, lower voltage, or combination of the two than that specified in the default parameter set 114.

Parameter select indicator 108 can be a register, latch, or other mechanism on a core 104 (e.g., core 104A, 104B and 104C) that can be used to provide an indicator that specifies which parameter set, default parameter set 114 or alternative parameter set 116, that the core 104 is to use during operation.

Hypervisor 122, when present, can execute on an end-user system containing one or more processors 102. Hypervisor 122 manages a virtualized operating environment and provides virtualized resources (e.g., virtualized hardware resources) for system 100. Hypervisor 122 manages virtual machines (also referred to as partitions) executing on various computers of system 100. A virtual machine runs an operating system and applications within the virtual machine. The operating system and applications running on one virtual machine may be completely different from the operating system and applications running on other virtual machines. For example, one virtual machine may be running an accounting system on the AIX operating system while another virtual machine may run file server applications on a Linux operating system. Alternatively, a virtual machine may run the same operating system and applications as another virtual machine and serve as a backup in case of a failure or overload in the other virtual machine. From the point of view of a virtual machine, the virtual machine appears to be an independent computer that controls the underlying hardware when in reality, each virtual machine is sharing hardware resource with other virtual machines.

Hypervisor 122 monitors resource usage (e.g., power usage, processor usage etc.) can set parameter select indicator 108 (either directly or indirectly) to indicate which parameter set, default parameter set 114 or alternative parameter set 116, that a particular processor core is to use. Those of skill in the art having the benefit of the disclosure will appreciate that an operating system or other entities on a system 100, both on processor 102 or external to processor 102 may set parameter select indicator 108 in order determine which parameter set a core processor 106 should use. These other entities may exist instead of, or in addition to, a hypervisor 122.

During operation, there may be a determination that a core 104 is to switch to the alternative parameter set 116. For example, during system initialization (e.g., boot), a parameter select indicator 108 may be set to specify that the default parameter set 114 is to be used to specify frequency and voltage combinations for core processor 106. However, during operation, hypervisor 122 may determine that increased performance is required for one or more processor cores 106. Thus, hypervisor 122 may cause parameter select indicator 108 to be changed for a processor core 106 to indicate that processor core 106 should use voltage and frequency combinations based on parameters from alternative parameter set 116.

After a change in the parameter select indicator 108, power-on reset engine (110, 118) resets the affected core 104. The power-on reset engine (110, 118) is configured to cause an individual core 104 to be reset (i.e., reinitialized), while the other cores 104 on processor 102 continue to operate without being reset. A single power-on reset engine 118 can control each of the cores 104 on a processor 102. Alternatively, each core 104 can have its own power-on reset engine 110.

Further details on the operation of system 100 are provided below with respect to FIG. 2.

Figure 2:
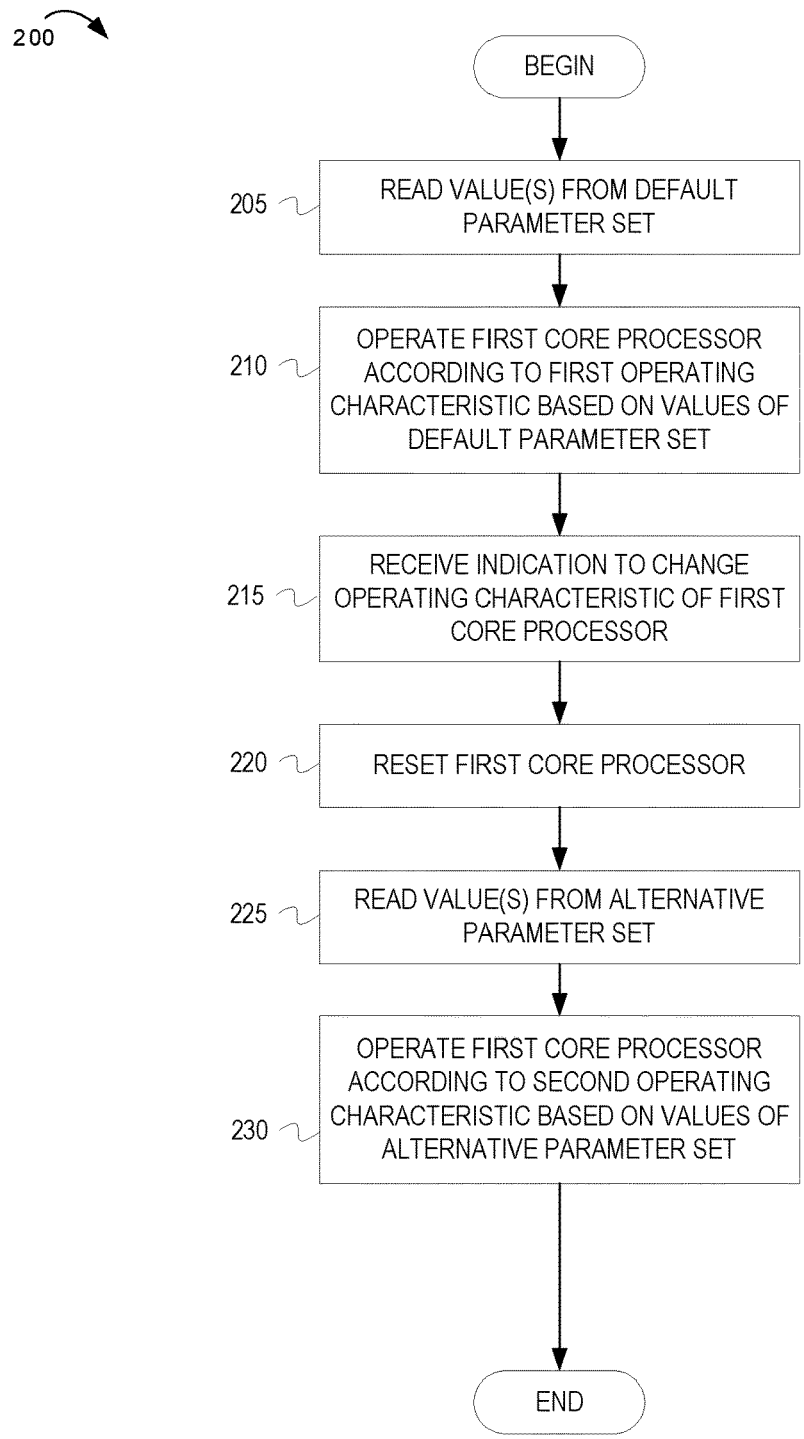
FIG. 2 is a flowchart illustrating a method for adaptive frequency optimization according to aspects of the disclosure.

FIG. 2 is a flowchart illustrating a method for adaptive frequency optimization according to aspects of the disclosure.

At block 205, a core processor reads operating characteristics from a default parameter set 114 (FIG. 1). For example, the core processor can be initializing during a boot phase of a system. The default parameter set 114 provides a first set of one or more voltages, frequencies, voltage/frequency combinations and/or timing data that the core processor can utilize during operation.

At block 210, the core processor operates at a frequency and/or voltage selected from the default parameter set 114. In addition, logical section of the core may operate according to timing data selected from the default parameter set 114.

At block 215, the core processor receives an indication to change an operating characteristic of the core processor. In some aspects, the core processor may receive an indication that a parameter selection indicator (i.e., a register, latch etc.) has been changed to indicate that the core processor should select voltage and/or frequency values from an alternative parameter set 116 (FIG. 1). As an example, a hypervisor or other entity external to processor 102 may cause the parameter selection indicator to be changed. Alternatively, an on-chip component such as an on-chip microcontroller that controls the frequencies and voltages at which the core processors operate may indicate that the operating characteristics are to be determined according to the alternative parameter set 116 rather than the default parameter set 114 (and vice versa).

At block 220, the core processor is reset. In some aspects, only the core processor that is affected by the parameter selection change is reset, the other core processors on the processor continue to run with their previously designated parameter set. In alternative aspects, some, none or all of the core processors can change operating characteristics. In some aspects, a power-on reset engine 118 (FIG. 1) causes the core processor to reset.

At block 225, the core processor that is being reset reads frequency, voltage and/or timing data from the alternative parameter set 116.

At block 230, the core processor operates at a frequency and/or voltage selected according to the alternative parameter set 116. In addition, the core can operate using timing data read from the alternative parameter set 116.

The operations at blocks 205-230 can be repeated for other core processors in a processor, or in core processors for a different processor in a system. Further, a core processor or multiple core processors can be set to switch from operating using voltages and/or frequencies specified in the alternative parameter set to voltages and/or frequencies specified in the default parameter set.

Figure 3:
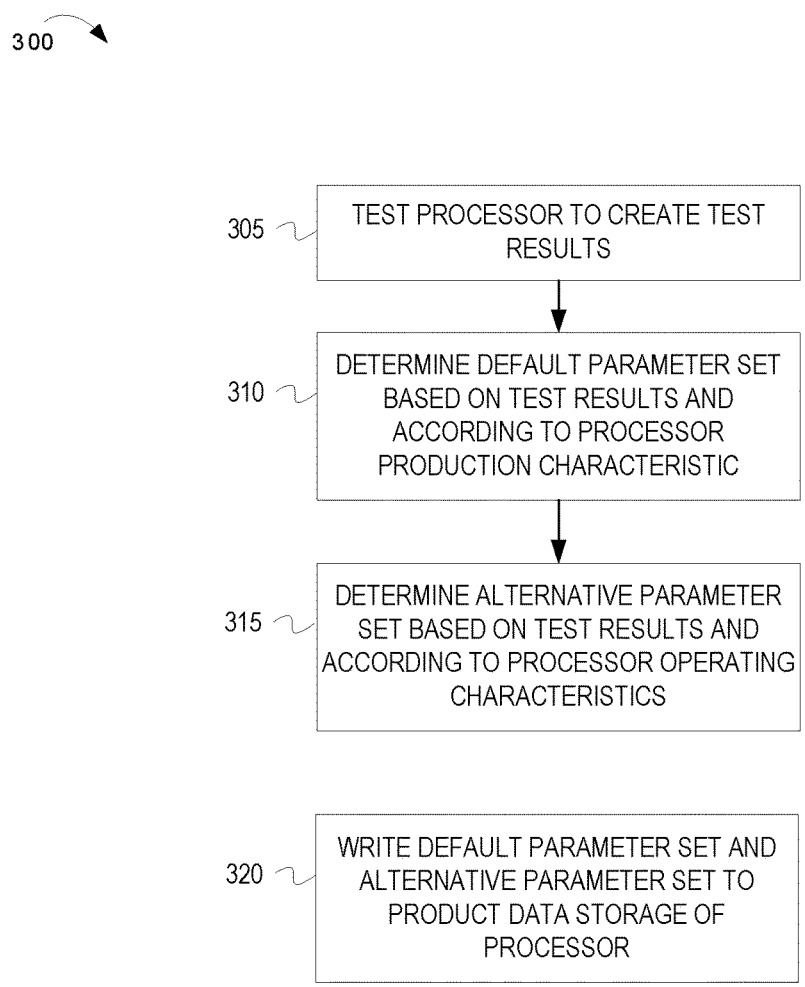
FIG. 3 is a flowchart illustrating a method for setting alternative operating characteristics of a processor according to aspects of the disclosure.

FIG. 3 is a flowchart illustrating a method for setting alternative operating characteristics of a processor according to aspects of the disclosure. As an example, the operations of FIG. 3 may be executed by a test system or other manufacturer's system after production of a processor.

At block 350, a processor is tested to create test results. The test results may be a set of one or more voltages, frequencies or voltage frequency combinations at which the processor is capable of error-free operation, or at which the processor operates within an acceptable temperature or voltage range.

At block 310, the system determines a default parameter set based on the test results and according to a processor production characteristic. As an example, the processor production characteristic may be a desired processor yield. For instance, in order to meet cost or margin goals, a manufacturer may desire to meet a particular yield based on an amount of silicon used to create the processors. The default parameter set 114 can be selected to meet the desired processor yield. Other production characteristics may include processor power consumption constraints, frequency performance constraints, or combinations of the above.

At block 315, the system determines an alternative parameter set for the processor based on the test result. At described above, a processor may be placed with a group of processors to meet production yield goals. However, the tested processor may be capable of operating at different frequency, voltage, or combination of the two that is different from those specified in the default parameter set. The system can determine the alternative parameter set 116 according to the test results and processor operating characteristics.

At block 320, The system can write the default parameter set 114 and the alternative parameter set to a product data memory 112 on the tested processor 102.

It should be noted that other methods can be used to determine the alternative parameter set. For example, the alternative parameter set 116 could be uniform across a subset of processor chips, tuned based on frequency, or tuned based on voltage, or tuned based on how the chip was manufactured.

Figure 4:
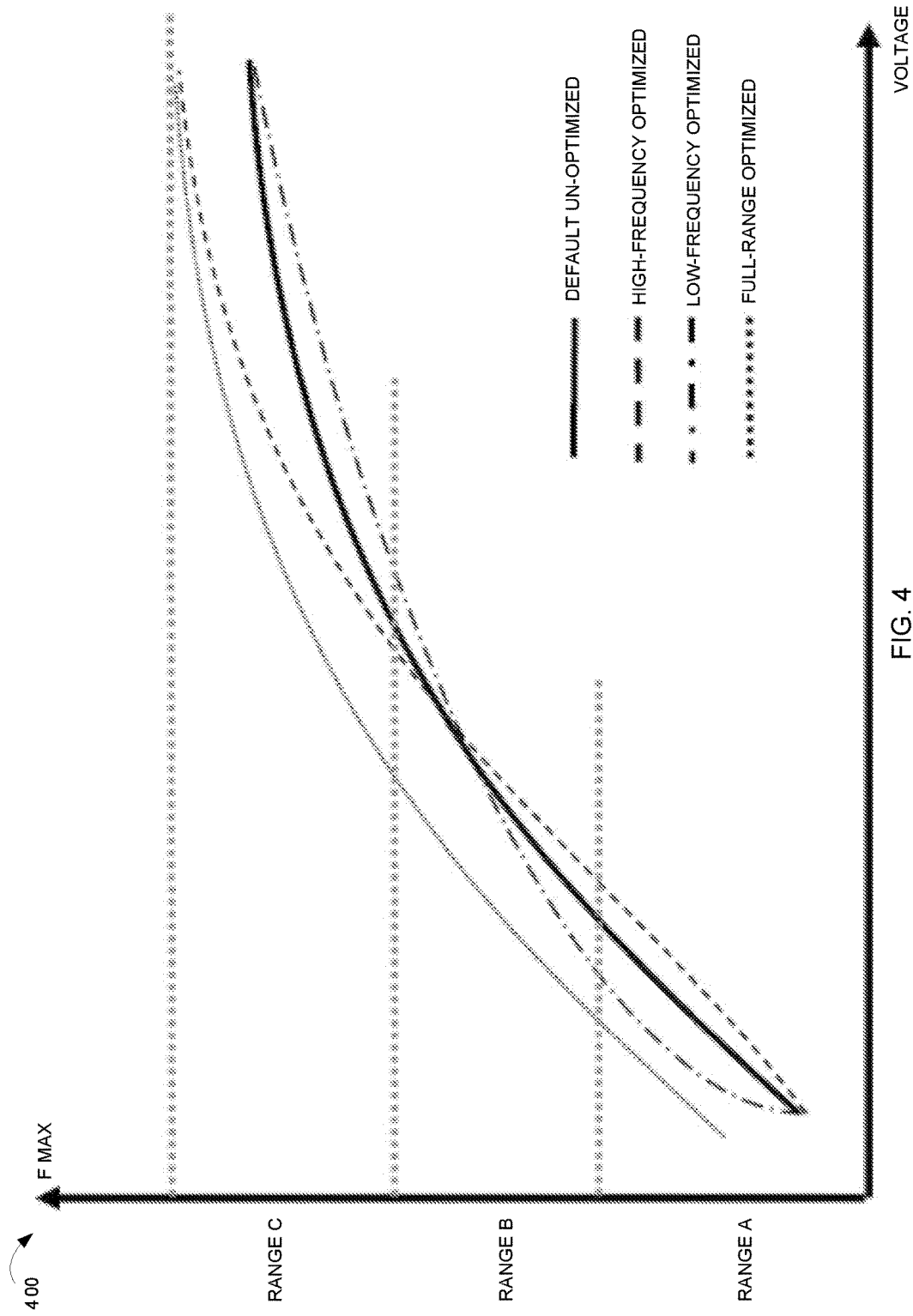
FIG. 4 is a graph 400 of example frequency/voltage operating characteristics.

FIG. 4 is a graph 400 of example frequency/voltage operating characteristics. The graph 400 illustrates different ranges of frequencies, and the corresponding voltage that is required for the frequency. The solid line illustrates a graph that may be used as the basis for the default parameter set 114. The dotted/dashed lines illustrate graphs that may be used to determine the alternative parameter set, depending on the optimization that is desired (i.e., high-frequency optimization, low-frequency optimization, or optimization throughout the frequency range).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
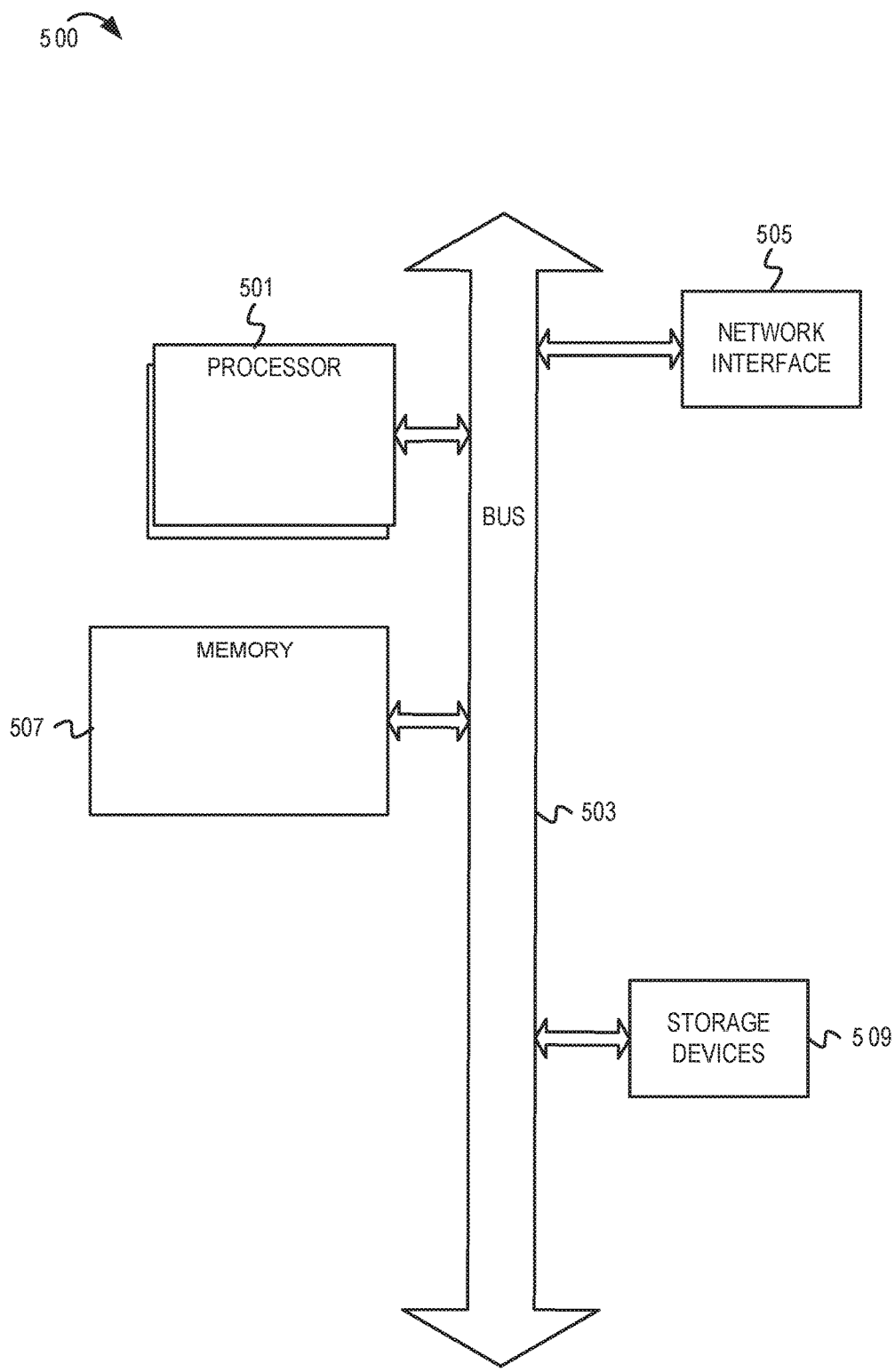
FIG. 5 depicts an example computer system in which aspects of the disclosure can be implemented.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The processor unit 501 can be a processor or microprocessor that includes the functionality and components described above with respect to FIGS. 1 and 2. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for adaptive frequency optimization as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for adaptive frequency in a processor having a plurality of cores, the method comprising:

receiving, in a memory of the processor, a default parameter set including a first plurality of combinations of frequency and voltage values compatible with a production characteristic of the processor, product data, and an alternative parameter set including a second plurality of combinations of frequency and voltage data indicating frequencies and voltages outside the specification of the processor that have been verified for the processor via testing the processor;

reading, from the memory by a first core of the plurality of cores, one or more values of the default parameter set;

operating the first core in accordance with a first operating characteristic based, at least in part, on the one or more values of the default parameter set;

receiving, from a hypervisor controlling the first core, an indication to change the operating characteristic of the first core; and in response to receiving the indication to change the operating characteristic, issuing a signal to the first core to reset, in response to receiving the reset, reading, by the first core, one or more values of the alternative parameter set, and operating the first core in accordance with a second operating characteristic based, at least in part, on the one or more values of the alternative parameter set.

2. The method of claim 1, wherein at least one other core of the plurality of cores is not reset in response to the indication to change the operating characteristic and wherein the at least one other processor core continues to operate in accordance with the first operating characteristic.

3. The method of claim 1, wherein operating the first core in accordance with the second operating characteristic comprises operating the first core at a different frequency than a frequency according to the first operating characteristic.

4. The method of claim 1, wherein operating the first core processor in accordance with the second operating characteristic comprises operating the first core processor at a different voltage than a voltage according to the first operating characteristic.

5. The method of claim 1, wherein operating the first core in accordance with the first operating characteristic comprises operating the first core at a first frequency and a first voltage determined according to a first frequency/voltage curve, and wherein operating the first core in accordance with the second operating characteristic comprises operating the first core at a second frequency and second voltage determined according to a second frequency/voltage curve different from the first frequency/voltage curve.

6. The method of claim 1, further comprising:
testing the processor at frequencies and voltages outside the specification of the processor to obtain test results;
determining, based at least in part on the test results, the alternative parameter set; and
writing the default parameter set and the alternative parameter set to a product data storage on the processor.

7. The method of claim 1, wherein the processor production characteristic comprises a processor production yield, and wherein the one or more processor operating characteristics comprises one of processor core operating frequency or processor core operating voltage.

8. A processor comprising:
a plurality of cores, the cores having core processors, wherein the cores include a first core having a first core processor; and a non-transitory memory to store a default parameter set
including a first plurality of combinations of frequency
and voltage values compatible with a production characteristic of the processor, product data, and an alternative parameter set including a second plurality of
combinations of frequency and voltage data indicating
frequencies and voltages outside the specification of the
processor that have been verified for the processor via
testing the processor;
a non-transitory machine readable medium including
instructions executable by one or more of the cores, the
instructions including
instructions to operate the first core processor in accordance with a first operating characteristic based, at least
in part, on the one or more values of the default
parameter set;
instructions to receive an indication to change the operating characteristic of the first core processor; and
instructions to in response to receipt of the indication to
change the operating characteristic,
issue a signal to the first core processor to reset,
in response to the reset, read, by the first core processor,
one or more values of the alternative parameter set,
and
operate the first core processor in accordance with a
second operating characteristic based, at least in part,
on the one or more values of the alternative parameter set.

9. The processor of claim 8, wherein at least one other processor core of the plurality of cores is not reset in response to the indication to change the operating characteristic and wherein the at least one other processor core continues to operate in accordance with the first operating characteristic.

10. The processor of claim 8, further comprising:
instructions to test the processor at frequencies and voltages outside the specification of the processor to obtain
test results;
instructions to determine, based at least in part on the test
results, the alternative parameter set; and
instructions to write the default parameter set and the
alternative parameter set to a product data storage on
the processor.

11. The processor of claim 8, wherein the hypervisor is external to the processor.

12. The processor of claim 8, wherein the second operating characteristic comprises a different frequency than a frequency according to the first operating characteristic.

13. The processor of claim 8, wherein the second operating characteristic comprises a different voltage than a voltage according to the first operating characteristic.

14. The processor of claim 8, wherein the default parameter set includes a first set of timing data and the alternative parameter set includes a second set of timing data.

15. The processor of claim 14, wherein the first set of timing data is tuned for a first frequency and the second set of timing data is tuned for a second frequency.

16. The processor of claim 8, wherein the first operating characteristic comprises a first frequency and a first voltage determined according to a first frequency/voltage curve, and wherein the second operating characteristic comprises a second frequency and second voltage determined according to a second frequency/voltage curve different from the first frequency/voltage curve.

17. The processor of claim 8, wherein the non-transitory memory comprises an SEEPROM.

\* \* \* \* \*